United States Patent [19]

Choi

[11] Patent Number: 5,111,282
[45] Date of Patent: May 5, 1992

[54] CHROMINANCE SUBCARRIER GENERATING CIRCUIT

[75] Inventor: Hae-yong Choi, Suwon, Rep. of Korea

[73] Assignee: SamSung Electronics Co., Ltd., Suwon, Rep. of Korea

[21] Appl. No.: 493,451

[22] Filed: Mar. 14, 1990

[30] Foreign Application Priority Data

Mar. 30, 1989 [KR] Rep. of Korea .................. 89-4111

[51] Int. Cl.⁵ .............................................. H04N 9/64
[52] U.S. Cl. ....................................... 358/40; 358/23; 358/25
[58] Field of Search ................ 358/40, 29 C, 29, 23, 358/25, 12, 17

[56] References Cited

U.S. PATENT DOCUMENTS

| | | | |
|---|---|---|---|
| 4,084,177 | 4/1978 | Aschwanden | 358/25 |
| 4,278,994 | 7/1981 | Van der Valk | 358/25 |
| 4,366,451 | 12/1982 | Kowal | 358/25 |
| 4,405,937 | 9/1983 | Kudo | 358/40 |

*Primary Examiner*—Tommy P. Chin
*Attorney, Agent, or Firm*—Robert E. Bushnell

[57] ABSTRACT

A chrominance subcarrier generating circuit for adjusting output levels of a plurality of chrominance subcarriers having different phases to the optimum level is disclosed. A filter removes harmonic components from the square signals to extract only the sinusolidal subcarriers, a first terminal provides first chrominance subcarriers after blocking DC components, a phase-shifter shifts the phases of the chrominance subcarriers, another terminal provides second chrominance subcarriers after blocking the DC components, and a power source filter and an auxiliary power source filter for preventing the first and second chrominance subcarriers from influencing other power sources and for blocking the noise coming from other power sources. Levels of the first and second chrominance subcarriers can be set properly regardless of the characteristics of the transistors.

4 Claims, 3 Drawing Sheets

CHROMINANCE SUBCARRIER GENERATING CIRCUIT

FIELD OF THE INVENTION

The present invention relates to a chrominance subcarrier generating circuit for generating chrominance subcarriers to be used in encoding and decoding the video signals in video cameras or video signal generating apparatus, and particularly to a circuit for generating a plurality of chrominance subcarriers having different phases one another.

BACKGROUND OF THE INVENTION

Generally in video cameras, video signal generating apparatus and video measuring instruments, when encodings and decodings for the video signals are to be carried out, only the chrominance subcarrier components are extracted out from the square waves, and two chrominance subcarriers having phases separated by 90 degrees from each other are output. The two chrominance subcarriers are subjected to a balanced modulation to form an I (or R−Y) signal or a Q (B−Y) signal, and are combined together to output them as color signals.

FIG. 1 illustrates a conventional circuit for producing first and second chrominance subcarriers. In this drawing, when square wave signals of 3.58 MHz which are outputted after frequency division by a chrominance subcarrier oscillator are applied to an input terminal IN, only the basic wave components (3.58 MHz sinusoidal wave components) are filtered from the square wave signals during passage through a current restricting resistance R1 and a filtering circuit which uses a coil L1 and a capacitor C1. The basic wave components filtered by the filtering circuit are transferred through a resistance R2 and a coupling capacitor C2 to the base of a transistor Q1.

The resistance R2 is a bleeder resistance, and base bias resistance R3,R4, are connected to the transistor Q1, so that certain basic wave components can be applied to the base of the transistor Q1. The 3.58 MHz sinusoidal waves supplied to the base terminal of the transistor Q1 are amplified to provide an inverse phase through its collector, and also are provided the normal phase through an emitter.

Thus, the amplitude of the output signals are amplified twice, in order to facilitate the operations of a phase shifting circuit for temperature compensation which uses a capacitor C3, resistances R7, R8 and a thermistor T1. The temperature compensating thermistor T1 is connected in parallel with the resistance R7, in such a manner that it should be capable of correcting the phase shifts due to the variations of the transistor Q1 and the capacitor C3 in accordance with the rise or drop of the temperature. That is, if the temperature is varied, then the resistance value of the thermistor T1 is varied, and at the same time, the constants of the phase shifting circuit are varied in accordance with capacitor C3 and the formula R8+R7/T1, so that the phase shifts due to the temperature variations are compensated.

Therefore, the phase-corrected signals are applied into the base terminal of a transistor Q2, and the emitter terminal outputs a 3.58 MHz sinusoidal wave signals assisted by an emitter load resistance R9 through an output terminal OUT1 for a first chrominance subcarrier. Meanwhile, if the first chrominance subcarriers obtained from the emitter terminal of the transistor Q2 are transmitted through a resistance R10 to the base terminal of a transistor Q3, inverted and amplified signals are transmitted through a collector terminal owing to the function of a collector load resistance R11, and non-inverted and amplified signals are provided through an emitter terminal owing to the function of an emitter load resistance R12.

The inverted and amplified signals from the collector terminal of the transistor Q3 are phase-shifted by a capacitor C4 during passage through a phase-shifting variable resistance VR1, and are mixed together with the non-inverted and amplified signals from the emitter terminal of the transistor Q3. Under this condition, the vector sum of the voltage between the two electrodes of the capacitor C4 and the current flowing through the capacitor C4, i.e., the voltage between The two ends of the variable resistance VR1, becomes the voltage Vec between the emitter and the collector of the transistor Q3.

If it is assumed that the voltage Vec between the emitter and the collector is constant, the voltage applied to the variable resistance VR1 and the voltage applied to the capacitor C4 form a phase separation of 90 degrees, and also form a value of the vector sum. Therefore, if the resistance value is increased by adjusting the variable resistance VR1, then the voltage drop between two ends of the variable resistance VR1 becomes larger, while, if the resistance value is decreased, the voltage drop is reduced.

If such phase-shifted signal currents are applied to the base terminal of a transistor Q4, second chrominance subcarriers are obtained from an emitter terminal of the transistor Q4, at an output terminal OUT2. Then the variable resistance VR1 is adjusted in such a manner that the first chrominance subcarriers and the second chrominance subcarriers have a phase separation of 90 degrees.

However, in the circuit operated in the manner described above, a single power source is used, and therefore, in the case where peaking or a ringing occurs at the ascending or descending edges of the square wave signals received, those square wave signals can be distorted during the filtering process, or a correct bandpass filtering can not be carried out depending on the characteristics of the transistor. Further, unless a phase adjustment is carried out for the phase-shifting circuit, the amplitudes of the phase-shifted waves can be varied.

SUMMARY OF THE INVENTION

Therefore it is the object of the present invention to provide a chrominance subcarrier generating circuit in which the output levels of a plurality of chrominance subcarriers having different phases one another can be adjusted to the optimum state.

For achieving the above object, the chrominance subcarrier generating circuit according to the present invention uses:

a filter extracting the sinusoidal chrominance subcarriers after removing the harmonic components from square signals outputted after frequency-divided by a frequency divider;

a terminal stage first chrominance subcarriers after blocking the DC components and increasing the amplitude of the chrominance subcarriers from the filtering means;

a phase-shifter shifting the phases of the chrominance subcarriers which are amplified by the terminal stage after being received from the filter;

another terminal stage providing second chrominance subcarriers after blocking the DC components and amplifying the amplitudes of the chrominance subcarriers from the phase shifter and a power source filter and an auxiliary power source filter for preventing the amplitude-modulated first and second chrominance subcarriers from influencing other power sources, and for blocking the noise coming from other power sources.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
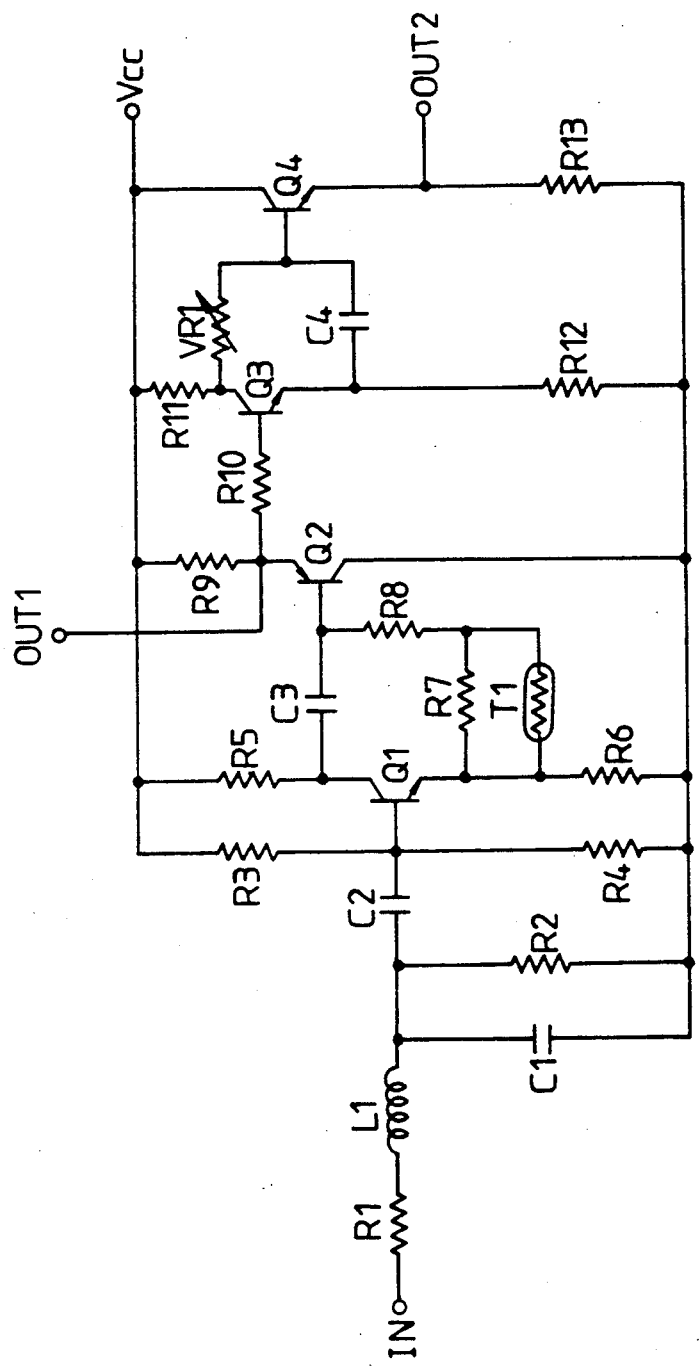
FIG. 1 illustrates a conventional circuit for generating chrominance subcarriers which are different each other.
Figure 2:
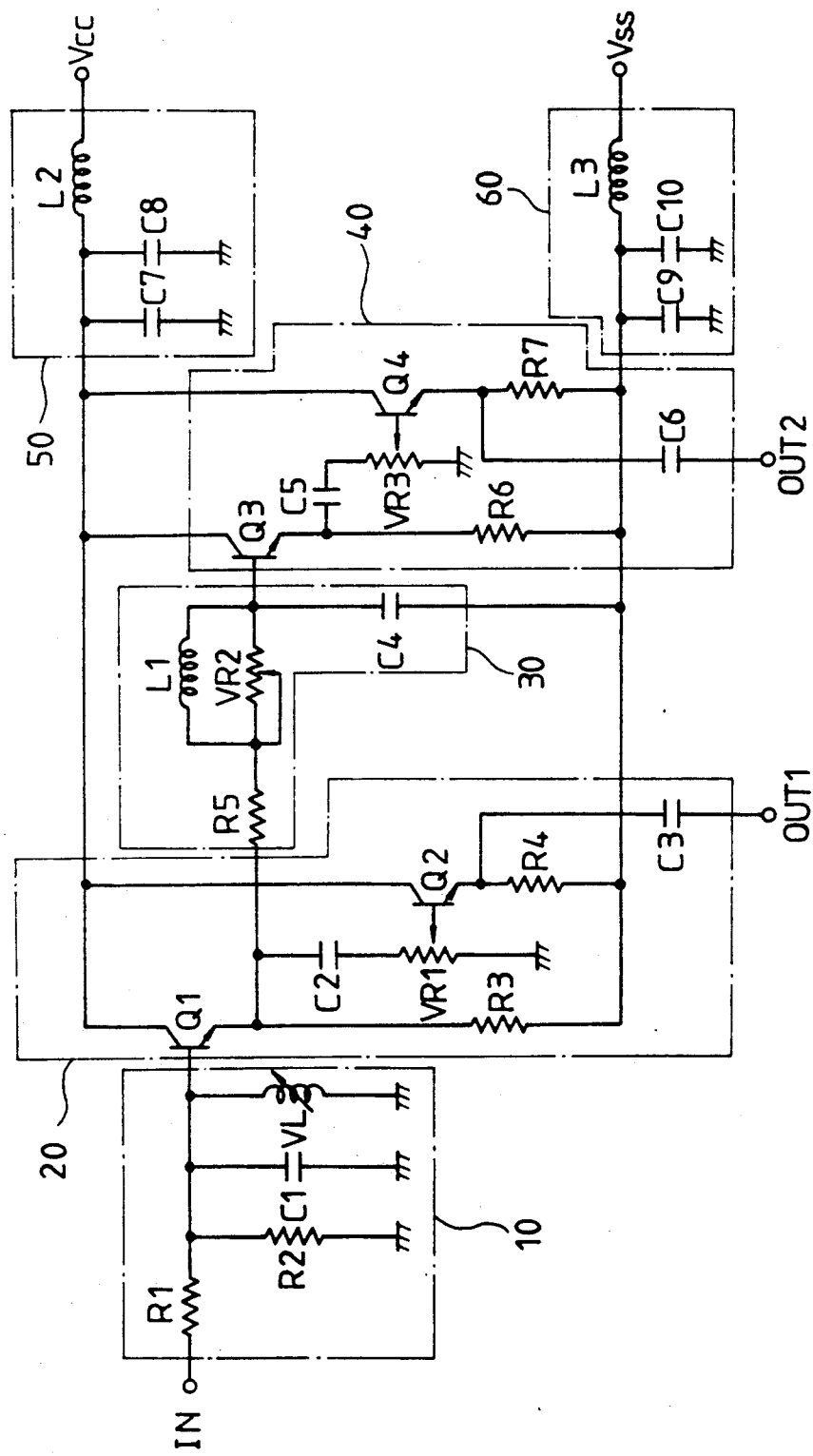
FIG. 2 is a circuit diagram of the chrominance subcarrier generating circuit according to the current invention.

The chrominance subcarrier generating circuit according to the current invention has a constitution as shown in FIG. 2. In this drawing, one end of a resistance R1 is connected to an input terminal IN of a band pass filter 10, in such a manner that, if square wave signals of 3.58 MHz from a chrominance subcarrier oscillator are applied to the input terminal IN after being frequency-divided, only the 3.58 MHz sinusoidal components should be output. Meanwhile, a bias resistance R2, a capacitor C1 and a variable coil VL are connected in parallel between a ground terminal and the other end of the resistance R1.

Power source filtering section 50 has a same constitution as that of an auxiliary power source filtering section 60 are constituted such that one end of a coil L2/L3 is connected to a power source terminal Vcc/Vss, and capacitors C7, C8 are connected in parallel between a ground terminal and the other end of the coil L2/L3 so as for the varying 3.58 MHz components to be kept from influencing the other power source, and so as for the noise coming from the other power source to be filtered off.

A first chrominance subcarrier output section 20 uses a transistor Q1 having a collector terminal and an emitter terminal respectively connected to the power source filtering section 50 and to the auxiliary power source filtering section 60, for amplifying the output signals of the band pass filter 10 which is to be supplied to a base terminal; a transistor Q2 for buffering the signals from the emitter terminal of the transistor Q1 which is connected through a capacitor C2 and a variable resistance VR1/ and a bias resistance R4 and a coupling capacitor C3 connected to the transistor Q2, thereby outputting first chrominance subcarriers to an output terminal OUT1 after removing the DC component from the 3.58 MHz sinusoidal component.

A phase shifting circuit 30 includes a current restricting resistance R5, a coil L1 and a variable resistance VR2 with coil L1 and resistance VR2 being connected in parallel with each other, and capacitor C4, in such a manner that the signals amplified and provided by transistor Q1 of the first level adjusting and buffering section 20 undergo a phase modulation by 90 degrees and is output by and through the resistance R5, the coil L1, the variable resistance VR2 and the capacitor C4, one end of which is connected to the auxiliary power source filtering section 60.

A second chrominance subcarrier output section 40 has a similar constitution as that of the first chrominance subcarrier output section 20 and include a transistor Q3 having the base connected to the phase shifting circuit 30, the collector connected to the power source filtering section 50 and the emitter connected to the auxiliary power source filtering section 60, respectively, and a transistor Q4 for bias amplifying the output signal of the transistor Q3 through the capacitor C5 and variable resistor VR3, and the emitter load resistors R6, R7 of the transistor Q3 and Q4, and a capacitor C3, so that it receives phase-modulated signals through the phase-shifting circuit 30, and outputs second chrominance subcarriers through a second output terminal OUT2.

A power source filtering section 50 is formed by coil $L_2$ connected to the power source Vcc, and capacitors C7, C8, while an auxiliary filtering section 60 is formed by coil $L_3$ connected to the auxiliary power source Vss, and capacitors C9 and C10.

The chrominance subcarrier generating circuit of the present invention constituted as above will now be described as to its operations.

If a 3.58 MHz square wave signal having a duty factor of 50% is received at the input terminal IN of the chrominance subcarrier generating circuit of FIG. 2 from a frequency divider (not shown), a voltage divided by the resistances R1, R2 is supplied to the base terminal of the amplifying transistor Q1 of the first level adjusting and filtering section 20, and an electric current governed by the input resistance of the transistor Q1 formed through the combined function of the resistances R1, R2 is supplied to the base terminal.

However, owing to the parallel resonance circuit formed by capacitor C1 and the variable coil VL and provided within the band pass filter 10, the signal supplied through the resistance R1 is encountered with the greatest impedance at the resonance frequency $$f = \frac{1}{2\pi \sqrt{VLC1}} = 3.58 \text{ MHz}$$

which is determined by the capacitor C1 and the variable coil VL, and therefore, the potential of the base terminal of the transistor Q1 rises to the greatest level. Therefore, the values of the resistances R1, R2, the capacitor C1 and the variable coil VL can be adjusted by raising the Q (quality factor) value so that the transist should amplify only at the resonance frequency, thereby bringing the ultimate result that only 3.58 MHz sinusoidal waves are outputted through the emitter terminal of the transistor Q1, after filtering off the other components from the 3.58 MHz square waves inputted through the resistance R1.

The 3.58 MHz sinusoidal waves further get rid of the DC component through the capacitor C2, and thus, only the regulated sinusoidal component flows through the variable resistance VR1.

If the electric current supplied to the base terminal of the transistor Q2 which is an output buffer-amplifier is increased by varying the variable resistance VR1, the amplitude of the first chrominance subcarriers outputted through the emitter terminal is increased and the DC component is removed through the capacitor C3 and are outputted through the output terminal OUT1.

Meanwhile, the signals outputted through the emitter terminal of the transistor Q1 are inputted into the phase shifting circuit 30. The phase shifting circuit 30 consists of a current restricting resistance R5, a variable resistance VR2, a coil L1 and a capacitor C4. The current flowing through the coiling lag in its phase than the voltage by 90 degrees, the current and the voltage have the same phase as the resistance, and the current supplied to the capacitor leads in its phase than the voltage by 90 degrees. These characteristics are utilized so that the signal voltage supplied through the resistance R5 have a phase difference of $90°\pm\alpha$ relative to the current supplied to the base terminal of the transistor Q3. The value of $\alpha$ is decided through the variation of the variable resistance VR2.

Figure 3:
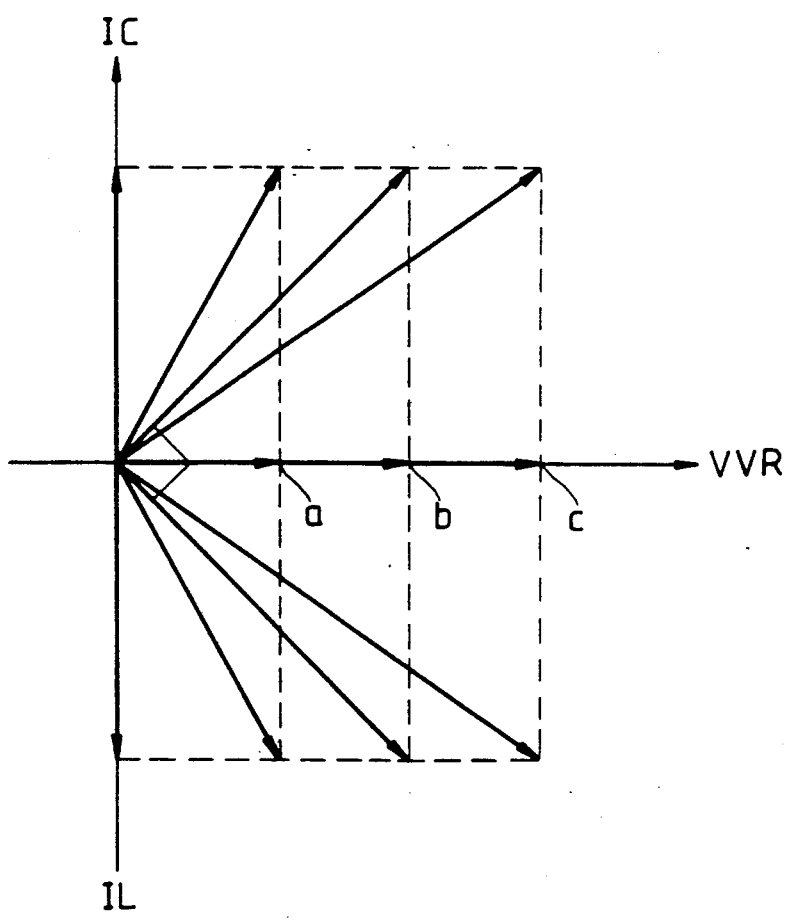
FIG. 3 illustrates the combination of vectors of the phase-shifting circuits included in the chrominance subcarrier generating circuit of FIG. 2.

The operation of the phase shifting circuit 30 will be described referring to the combined of vectors of FIG. 3.

If it is assumed that the current flowing through the coil VL1 is iL, the current flowing through the capacitor C4 is iC, and the voltage acrossing the variable resistance VR2 is VVR, the angle of the combined vectors are varied as the voltage acrossing the variable resistance VR2 is varied. That is, if the voltage VVR reaches a point c of FIG. 3, which is bigger than a point b which is the reference value (with 90 degrees of the combined vectors), the angle of the combined vector becomes smaller than 90 degrees, while, if the voltage VVR reaches a point a, the angle of the combined vectors becomes bigger than 90 degrees.

Therefore, if the signals adjusted by the variable resistance VR2 are supplied to the base terminal of the transistor Q3 of the second chrominance subcarrier output section 40, signals having a phase difference of 90 degrees relative to the first chrominance subcarriers are outputted through the emitter terminal.

The signals from the emitter terminal of the transistor Q3 are deprived of the DC component through the capacitor C5, so that only the AC component is supplied to the variable resistance VR3. By adjusting the variable resistance VR3, the amount of the signals supplied to the base terminal of the transistor Q4 which is an output buffer-amplifier can be adjusted so that it should be fit to the amplitude and the regulated value of the first chrominance subcarriers, and therefore, the output of the transistor Q3, which is varied through the variable resistance VR2, can be compensated.

Accordingly, the transistor Q4 will buffer and amplify the signals which are phase-shifted by 90 degrees relative to the first chrominance subcarriers, and second chrominance subcarriers which have got rid of the DC component are outputted through the output terminal OUT2.

The power source filtering section 50 consisting of the capacitors C7, C8 and the coil L2, and the auxiliary power source filtering section 60 consisting of the capacitors C9, C10 and the coil L3 keep the 3.58 MHz component from giving any influence to the other power sources, and also keep away the noise incoming from the other power sources.

As described above, the circuit of the present invention has the advantage that the peakings and ringings occurring at the descending and ascending edges of the input square waves can be precisely filtered off by adding the auxiliary power source, so that the levels of the first and second chrominance subcarriers can be properly varied and set regardless of the characteristics of the transistors, and that the amplitude variations due to the phase shiftings can be minimized.

What is claimed is:

1. A chrominance subcarrier generating circuit for generating chrominance subcarriers having different phases in response to reception of square-wave signals, comprising:

filtering means for extracting sinusoidal chrominance subcarriers after removing harmonic components from square signals;

first terminal means for providing first chrominance subcarriers after blocking the direct current components and after amplifying the amplitudes of the sinusoidal chrominance subcarriers from said filtering means;

phase shifting means for providing phase-shifted chrominance subcarriers by shifting the phase of the chrominance subcarriers amplified by said first terminal means;

second terminal means for providing second chrominance subcarriers after blocking direct current components and amplifying the amplitudes of the phase-shifted chrominance subcarriers; and first power source filter means and auxiliary power source filter means for attenuating noise components of the first and second chrominance subcarriers.

2. The chrominance subcarrier generating circuit as claimed in claim 1, wherein said first and second terminal means providing the first and second chrominance subcarriers each comprises:

an amplifying transistor having a collector terminal and an emitter terminal respectively connected to said first power source filter means and to said auxiliary power source filter means, amplifying the signals inputted to its base terminal; and output buffer-amplifier means for receiving the signals passed through a direct current component blocking capacitor and a variable resistance after passing through said amplifying transistor, and for buffering and outputting said signals.

3. The chrominance subcarrier generation circuit as claimed in claim 1, wherein said auxiliary power source filtering means comprises a coil connected to the auxiliary power source and capacitors.

4. The chrominance subcarrier generating circuit as claimed in any one of claims 1 or 2, wherein said phase-shifting means is further comprised of:

impedance means for displacing the phase of inputted sinusoidal waves through utilization of the phase difference between the voltage and current.

* * * * *

UNITED STATES PATENT AND TRADEMARK OFFICE
CERTIFICATE OF CORRECTION

PATENT NO.   :         5,111,282
DATED        :   May 5, 1992
INVENTOR(S)  :   Hae-yong CHOI It is certified that error appears in the above-identified patent and that said Letters Patent is hereby corrected as shown below:

Column 1,   Line 12,   insert --from-- after "phases";

Column 2,   Line 16,   replace "The" with --the--;

Line 55,   insert --from-- after "phases";

Line 65,   insert --for outputting-- after "stage";

Column 3,   Line 7,    insert a semicolon after "shifter";

Line 20,   insert --from-- after "different";

Column 5,   Line 28,   replace "acrossing" with --across--;

Line 30,   replace "acrossing" with --across--.

Signed and Sealed this

Sixth Day of July, 1993

*Attest:*

MICHAEL K. KIRK

*Attesting Officer*      *Acting Commissioner of Patents and Trademarks*